(12) United States Patent
Huber

(10) Patent No.: US 11,946,574 B2
(45) Date of Patent: Apr. 2, 2024

(54) DOUBLE BAND CLAMP ASSEMBLY FOR NO HUB COUPLING

(71) Applicant: Donald Gene Huber, Tacoma, WA (US)

(72) Inventor: Donald Gene Huber, Tacoma, WA (US)

( * ) Notice: Subject to any disclaimer, the term of this patent is extended or adjusted under 35 U.S.C. 154(b) by 66 days.

(21) Appl. No.: 17/853,099

(22) Filed: Jun. 29, 2022

(65) Prior Publication Data

US 2023/0003321 A1 Jan. 5, 2023

Related U.S. Application Data

(60) Provisional application No. 63/217,326, filed on Jul. 1, 2021.

(51) Int. Cl.
*F16L 33/08* (2006.01)
*F16L 21/00* (2006.01)
*F16L 21/08* (2006.01)

(52) U.S. Cl.
CPC ............ *F16L 21/08* (2013.01); *F16L 21/002* (2013.01)

(58) Field of Classification Search
CPC ......... F16L 21/002; F16L 33/08; F16L 33/06; F16L 33/04; F16L 33/085; F16L 33/10; F16L 33/12; F16L 33/14; F16L 21/08; F16B 2/08
See application file for complete search history.

(56) References Cited

U.S. PATENT DOCUMENTS

| | | | | |
|---|---|---|---|---|
| 1,182,161 A * | 5/1916 | Funk | ....................... | F16L 33/04 24/286 |
| 1,359,229 A * | 11/1920 | Cacadier | ................. | F16L 33/04 24/283 |
| 1,673,454 A * | 6/1928 | Hochstein | ............... | F16L 33/04 251/90 |
| 1,965,207 A * | 7/1934 | Walker | .................... | F16L 33/12 81/9.3 |
| 2,703,216 A * | 3/1955 | Petersen | ................... | F16B 2/08 269/131 |
| 2,958,549 A * | 11/1960 | Spafford | ................. | F16L 33/08 285/252 |
| 4,093,282 A * | 6/1978 | Kyriakodis | ............. | F16L 33/08 285/259 |
| 5,368,337 A * | 11/1994 | Torres | ..................... | F16L 33/08 285/318 |
| 2004/0087247 A1* | 5/2004 | Duncan | ................... | F16L 33/04 446/491 |
| 2015/0292655 A1* | 10/2015 | Sulka | ..................... | F16L 33/08 285/420 |
| 2021/0108744 A1* | 4/2021 | DeWitt | ................ | F16L 21/002 |

* cited by examiner

*Primary Examiner* — David Bochna
(74) *Attorney, Agent, or Firm* — Phillips Lytle LLP; David L. Principe

(57) ABSTRACT

A double band clamp assembly with a no-hub coupling. The clamp assembly has a first elongate band with a first end and a second end disposed opposite from the first end. The clamp assembly includes a second elongate band having a first end and a second end opposite from the first end. The second elongate band is disposed in spaced apart, substantially parallel relation to the first elongate band. A third elongate band has a plurality of slots defined therein. The third elongate band has a first end and a second end disposed opposite from the first end. The third elongate band extends from the first ends of the first and second elongate bands.

17 Claims, 4 Drawing Sheets

DOUBLE BAND CLAMP ASSEMBLY FOR NO HUB COUPLING

TECHNICAL FIELD

This disclosure relates to connectors for connecting pipes. In particular features for a double band clamp assembly are disclosed.

BACKGROUND ART

Pipe connectors are used for connecting the ends of pipes to allow for continuous and sealed passage of fluid between the pipes. One such connector is a no hub coupling. No hub couplings may comprise gaskets made from an elastomeric compound housed inside a corrugated shield that may be constructed of stainless steel. Up to six stainless steel band clamps with screws or worm gears may be used to surround the shield to provide the sealing force against the pipes being joined. What is needed is a band clamp assembly for use with a no-hub coupling that reduces the hardware requirements thereby reducing costs and making it easier to manufacture.

BRIEF SUMMARY OF THE INVENTION

The present invention meets the above described need by providing a double band clamp assembly for use with no hub couplings. With parenthetical reference to the corresponding parts, portions or surfaces of the disclosed embodiment, merely for the purposes of illustration and not by way of limitation, the present invention provides a clamp assembly having a first elongate band (123) with a first end (129) and a second end (132) disposed opposite from the first end (129). The clamp assembly includes a second elongate band (126) having a first end (135) and a second end (138) opposite from the first end (135). The second elongate band (126) is disposed in spaced apart, substantially parallel relation to the first elongate band (123). A third elongate band (141) has a plurality of slots (150) defined therein. The third elongate band (141) has a first end (142) and a second end (143) disposed opposite from the first end (142). The third elongate band (141) extends from the first ends (129, 135) of the first and second elongate bands (123, 126).

A worm drive (153) is mounted at the second ends (132, 138) of the first and second elongate bands (123, 126). The worm drive (153) is configured to engage with the slots (150) on the third elongate band (141) such that the second end (143) of the third elongate band (141) is connected to the worm drive (153) to from a loop with an adjustable diameter.

In another aspect, the worm drive (153) comprises a screw.

In another aspect, the worm drive (153) comprises a worm gear.

In another aspect, the third elongate band (141) has a base (144) configured to attach to the first and second elongate bands (123, 126).

In yet another aspect of the invention, the third elongate band (141) and the base (144) form a T-shaped member.

Another aspect of the invention comprises a base plate (156) attached to the first and second elongate bands (123, 126).

DESCRIPTION OF THE PREFERRED EMBODIMENTS

Figure 1:
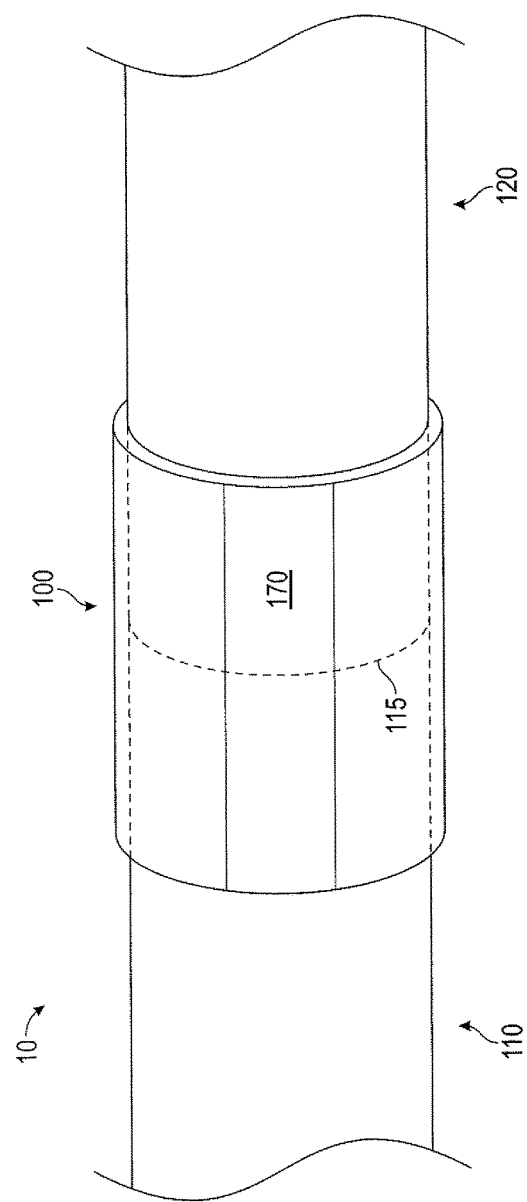
FIG. 1 is a perspective view of an embodiment of an assembly of a no hub coupling joining two pipe ends.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

FIG. 1 is a perspective view of an assembly 10 of a no-hub coupling 100 securing a first pipe 110 with a second pipe 120. The pipes 110, 120 may be circular, metallic pipes used in a variety of contexts. For example, the pipes 110, 120 may be used for plumbing or for other fluid transportation purposes. The pipes 110, 120 may have other cross-section shapes beside circular and/or be formed of other materials. In some embodiments, the pipes 110, 120 may be other fluid-conveying members besides pipes, including but not limited to tubes such as automotive or engine tubes or lines, flexible tubes, channels, and the like. The pipes 110, 120 may meet at an interface 115. The interface 115 may be a location where the first pipe 110 abuts the second pipe 120. The interface 115 is shown in dashed line because it is underneath the coupling 100. The interface 115 may include other features located in between the two adjacent ends of the pipes 110, 120, for example a gasket or portions thereof. Therefore, the embodiment of the assembly 10 shown is exemplary only.

The no-hub coupling 100 may surround the two ends of the pipes 110, 120. The no-hub coupling 100 may have a hollow interior with a generally circular or otherwise rounded shape configured to surround and conform to a contour or contours of the outer surfaces of the pipes 110, 120, and/or to other features in between the no-hub coupling 100 and the pipes 110, 120. Although described primarily herein as having a generally circular or otherwise rounded shape, the no-hub coupling 100 may have other shapes to conform to non-circular or non-rounded shapes or segments of the pipes 110, 120. Portions of the outer surfaces of the pipes 110, 120 are shown in dashed line underneath the no-hub coupling 100 for clarity. As is discussed in further detail below, other features or structures may be located in between the no-hub coupling 100 and the outer surfaces of the two pipes 110, 120. For example, there may be a gasket or other types of seals in between the no-hub coupling 100 and the two pipes 110, 120.

Figure 2:
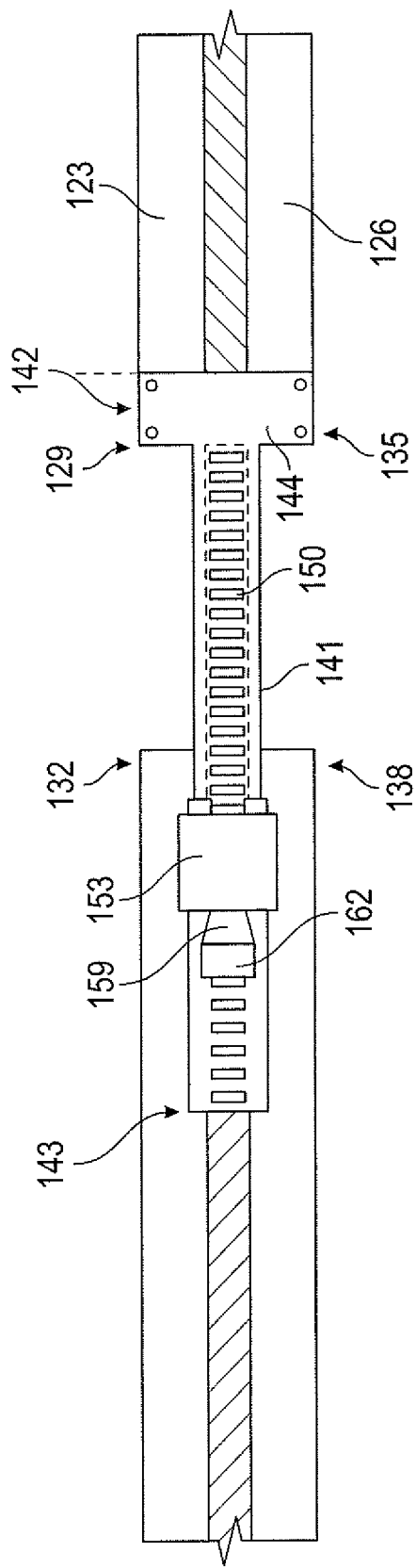
FIG. 2 is a top plan view of an embodiment of the double band clamp assembly of the present invention attached end-to-end.

Turning to FIG. 2, a first elongate band 123 and a second elongate band 126 are disposed in spaced apart, parallel relation. The bands 123, 126 may be constructed of a durable rigid material such as steel or the like. The first band 123 has a first end 129 and a second end 132 disposed opposite from the first end 129. The second band 126 has a first end 135 and a second end 138 disposed opposite from the first end 135.

A third elongate band 141 extends from the first end 129, 135 of the first and second bands 123, 126 respectively. The third elongate band 141 has a first end 142 and a second end 143 disposed opposite from the first end 142. As shown the third elongate band 141 is centered between the outside edges of the two bands 123, 126. The third elongate band 141 may be provided with a base 144 at the first end 142 that attaches to the first band 123 and second band 126 at the first ends 129, 135. The base 144 may be attached to the first and second bands 123, 126 by fasteners inserted into openings 147 (FIG. 6) defined in the bands 123, 126. It will be evident to those of ordinary skill in the art based on this disclosure that the other mechanical arrangements for attaching the third elongate band 141 to the first and second elongate bands 123, 126 would also be suitable. In addition, the third elongate band 141 may be integrally formed with the first and second elongate bands 123, 126.

The third elongate band 141 may be provided with a plurality of slots 150 that extend along the length of the band 141. The slots 150 may be configured to engage with a worm drive such as a worm gear or screw described herein.

A worm drive 153 may be attached to a base plate 156 (FIG. 5) located at the second ends 132, 138. The worm drive 153 may comprise a screw 159 or a worm gear. Rotating the head 162 on the screw 159 causes the flights to engage with the slots 150 disposed toward the second end 143 of the third elongate band 141. Accordingly, turning the screw 159 advances the third elongate band 141 from right to left with respect to the orientation of the figure which tightens the first and second elongate bands 123, 126 in a loop around the shield 170 (FIG. 1) of the no hub coupling 100.

Figure 3A:
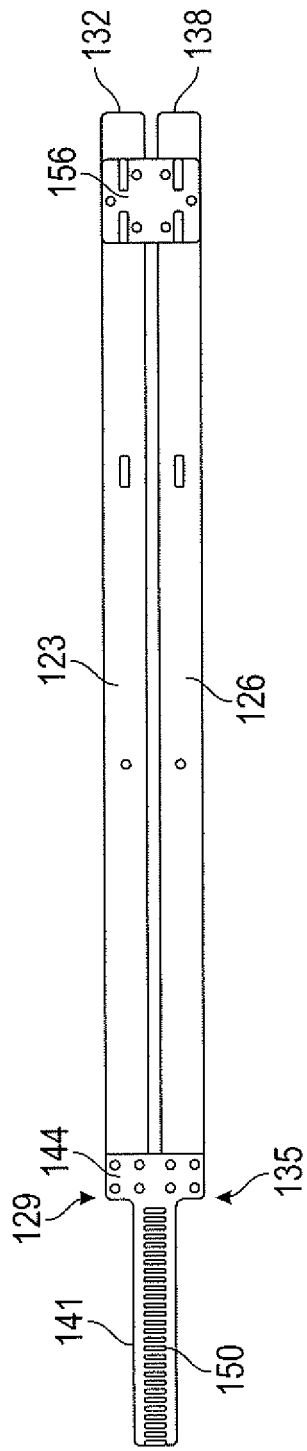
FIG. 3A is a plan view of a subassembly of the embodiment shown in FIG. 2
Figure 3B:
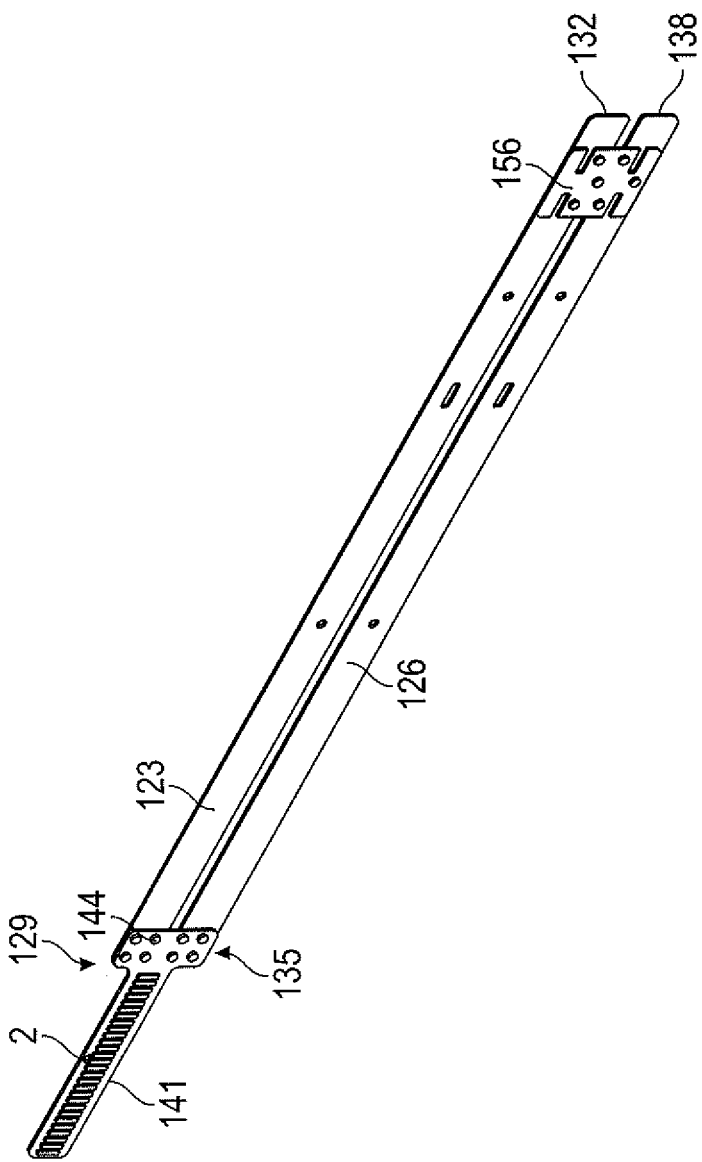
FIG. 3B is a perspective view of the subassembly of FIG. 3A.

Turning to FIGS. 3A-3B, the first and second elongate bands 123, 126 are shown in a flat, fully extended configuration. The first ends 129, 135 receive the base 144 of the third elongate band 141. At the opposite end of the first and second elongate bands 123, 126, the second ends 132, 138 receive the base plate 156. The base plate 156 may be attached at the second ends 132, 138 by means of fasteners. The base plate 156 is configured to receive and support a worm drive at the second ends 132, 138 of the first and second elongate bands 123, 126.

Figure 4:
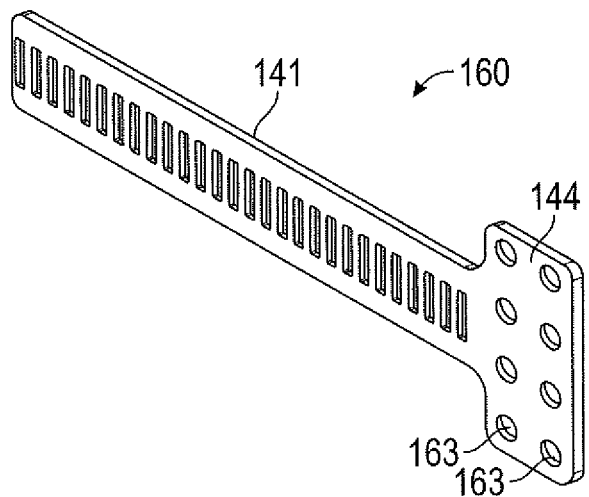
FIG. 4 is a perspective view of a component of the subassembly shown in FIG. 3.

In FIG. 4, the third elongate member 141 may be formed as a unitary construction with an elongate portion 160 terminating at a rectangular base 144 to form an overall T-shaped member. The rectangular base 144 may be provided with a plurality of holes 163 for mounting the base to the first and second elongate members 123, 126.

Figure 5:
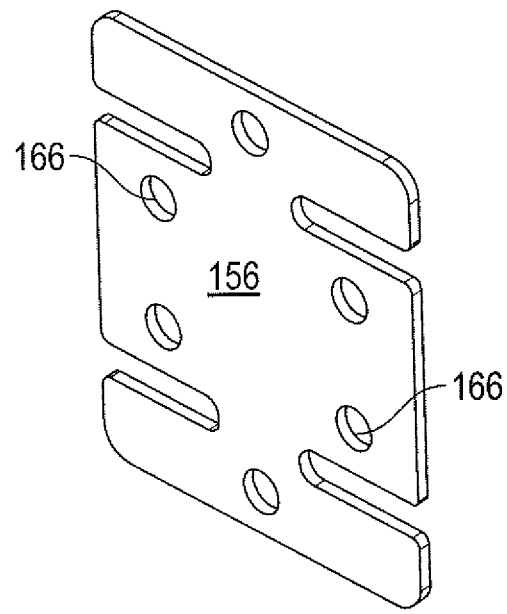
FIG. 5 is a perspective view of a base plate of the embodiment.

Turning to FIG. 5, the base plate 156 may be formed with a plurality of openings 166 for receiving fasteners for mounting the base plate 156 to the first and second elongate bands 123, 126.

Figure 6:
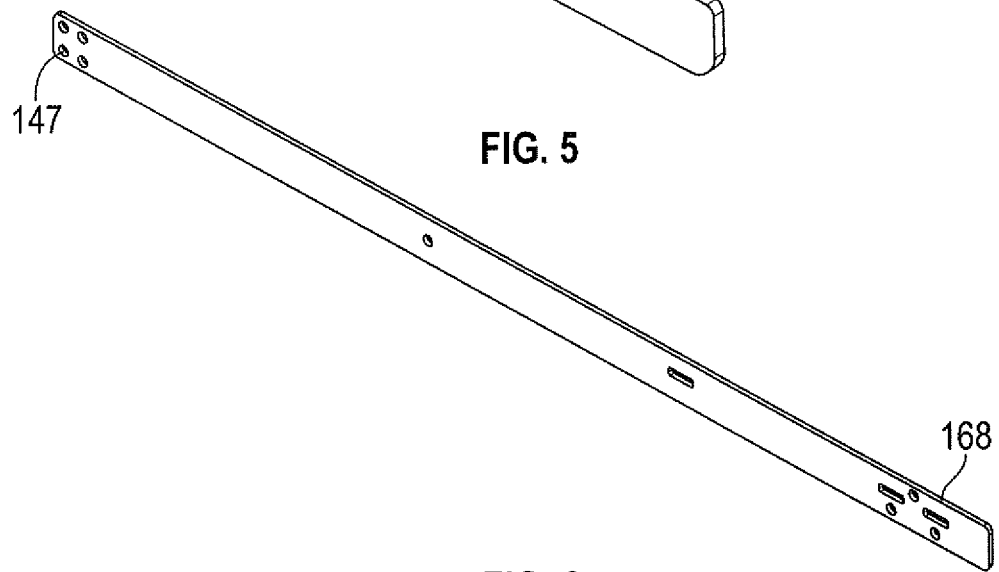
FIG. 6 is a perspective view of one of the components of the subassembly shown in FIG. 3.

In FIG. 6, the first elongate band 123 is shown. At the first end 129, there is a hole pattern for aligning with the openings in the base 144 of the third elongate band 141. The holes 147 provide for mounting the base 144 to the first and second elongate bands 123, 126. At the second end 135, there is a triangular pattern of openings 168 for aligning with the openings 166 in the base plate 156 (FIG. 5). The openings 166, 168 may be aligned and then a fastener may be inserted to attach the base plate 156 for the worm drive 153 to the first and second elongate bands 123, 126.

The present invention contemplates that many changes and modifications may be made. Therefore, while the presently-preferred form of the double band clamp assembly has been shown and described, and several modifications and alternatives discussed, persons skilled in this art will readily appreciate that various additional changes and modifications may be made without departing from the spirit of the invention, as defined and differentiated by the following claims.

The invention claimed is:

1. A clamp assembly, comprising:
a first elongate band having a first end and a second end disposed opposite from the first end;
a second elongate band having a first end a second end disposed opposite from the first end, the second elongate band disposed in spaced apart, substantially parallel relation to the first elongate band;
a third elongate band having a plurality of slots defined therein, the third elongate band having a first end and a second end, the third elongate band extending from the first end of the first and second elongate bands;
a worm drive mounted at the second end of the first and second elongate bands, the worm drive configured to engage with the slots on the third elongate band such that the first end of the third elongate band is connected to the worm drive to from a loop with an adjustable diameter.

2. The clamp assembly of claim 1, wherein the worm drive comprises a screw.

3. The clamp assembly of claim 1, wherein the worm drive comprises a worm gear.

4. The clamp assembly of claim 1, wherein the third elongate band has a base configured to attach to the first and second elongate bands.

5. The clamp assembly of claim 4, wherein the base is attached near the first end of the first and second elongate bands.

6. The clamp assembly of claim 4, wherein the third elongate band and the base form a T-shaped member.

7. The clamp assembly of claim 1, further comprising abase plate attached to the first and second elongate bands.

8. The clamp assembly of claim 1, wherein the base plate is attached near the second end of the first and second elongate bands.

9. A no-hub coupling assembly for use in connecting a first pipe and a second pipe in end-to-end relation, the assembly comprising:
a no-hub coupling having a hollow interior configured to receive the ends of the first and second pipes, the no-hub coupling having an elastomeric body surrounded by a shield;
a band clamp assembly disposed around the circumference of the shield, the band clamp assembly comprising a first elongate band having a first end and a second end disposed opposite from the first end, a second elongate band having a first end a second end disposed opposite from the first end, the second elongate band disposed in spaced apart, substantially parallel relation to the first elongate band, a third elongate band having a plurality of slots defined therein, the third elongate band having a first end and a second end, the third elongate band extending from the first end of the first and second elongate bands, and a worm drive mounted at the second end of the first and second elongate bands, the worm drive configured to engage with the slots on the third elongate band such that the first end of the third elongate band is connected to the worm drive to from a loop with an adjustable diameter.

10. The clamp assembly of claim 9, wherein the worm drive comprises a screw.

11. The clamp assembly of claim 9, wherein the worm drive comprises a worm gear.

12. The clamp assembly of claim 9, wherein the third elongate band has a base configured to attach to the first and second elongate bands.

13. The clamp assembly of claim 12, wherein the base is attached near the first end of the first and second elongate bands.

14. The clamp assembly of claim 12, wherein the third elongate band and the base form a T-shaped member.

15. The clamp assembly of claim 9, further comprising a base plate attached to the first and second elongate bands.

16. The clamp assembly of claim 9, wherein the base plate is attached near the second end of the first and second elongate bands.

17. A pipe assembly, comprising:

a first pipe;

a second pipe disposed in end-to-end relation first pipe;

a no-hub coupling having a hollow interior configured to receive the ends of the first and second pipes in abutting relationship, the no-hub coupling having a shield disposed thereon;

a double band clamp assembly disposed around the circumference of the shield, the assembly comprising, a first elongate band having a first end and a second end disposed opposite from the first end, a second elongate band having a first end a second end disposed opposite from the first end, the second elongate band disposed in spaced apart, substantially parallel relation to the first elongate band, a third elongate band having a plurality of slots defined therein, the third elongate band having a first end and a second end, the third elongate band extending from the first end of the first and second elongate bands, and a worm drive mounted at the second end of the first and second elongate bands, the worm drive configured to engage with the slots on the third elongate band such that the first end of the third elongate band is connected to the worm drive to from a loop with an adjustable diameter.

\* \* \* \* \*